United States Patent

Stantus

[15] 3,661,033
[45] May 9, 1972

[54] DUAL CONTROL DEVICE FOR AUTOMOBILES

[72] Inventor: John J. Stantus, North 5321 Lehman Road, Spokane, Wash. 99206
[22] Filed: Dec. 11, 1969
[21] Appl. No.: 884,254

[52] U.S. Cl. ..........................................................74/562.5
[51] Int. Cl. .....................................................G05g 1/16
[58] Field of Search ......................74/562.5, 562, 478.5, 480

[56] References Cited

UNITED STATES PATENTS

| | | | |
|---|---|---|---|
| 2,694,946 | 11/1954 | Vandal | 74/562.5 |
| 2,890,597 | 6/1959 | Allgaier | 74/562.5 |

FOREIGN PATENTS OR APPLICATIONS 515,126   8/1955   Canada..................................74/562.5

Primary Examiner—Milton Kaufman
Assistant Examiner—F. D. Shoemaker
Attorney—Norman H. Huff

[57] ABSTRACT

A selectively applicable dual control device for application to many automotive vehicles having a manually depressable foot pedal, comprising: a transverse rock shaft journaled in aligned journal bearings releasably fixed relative to the vehicle structure and having an articulate link pedal actuating means at one end and an arm having an auxiliary pedal, releasably attached for selective radial and axial positions to the rock shaft and thus conventionally disposed for use by an occupant seated beside the driver.

2 Claims, 3 Drawing Figures

PATENTED MAY 9 1972 3,661,033

JOHN J. STANTUS
INVENTOR.

BY Norman H. Buff

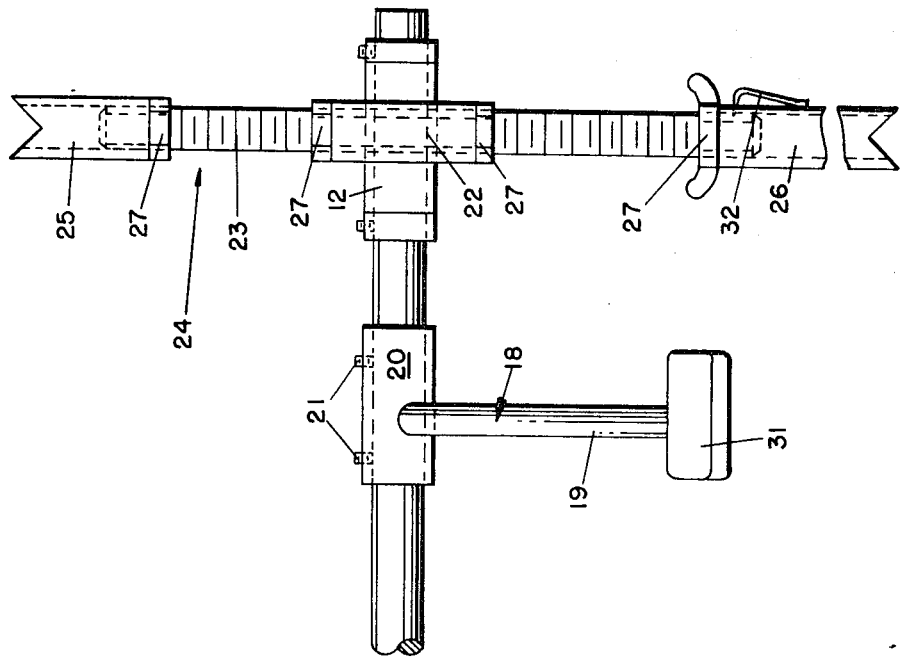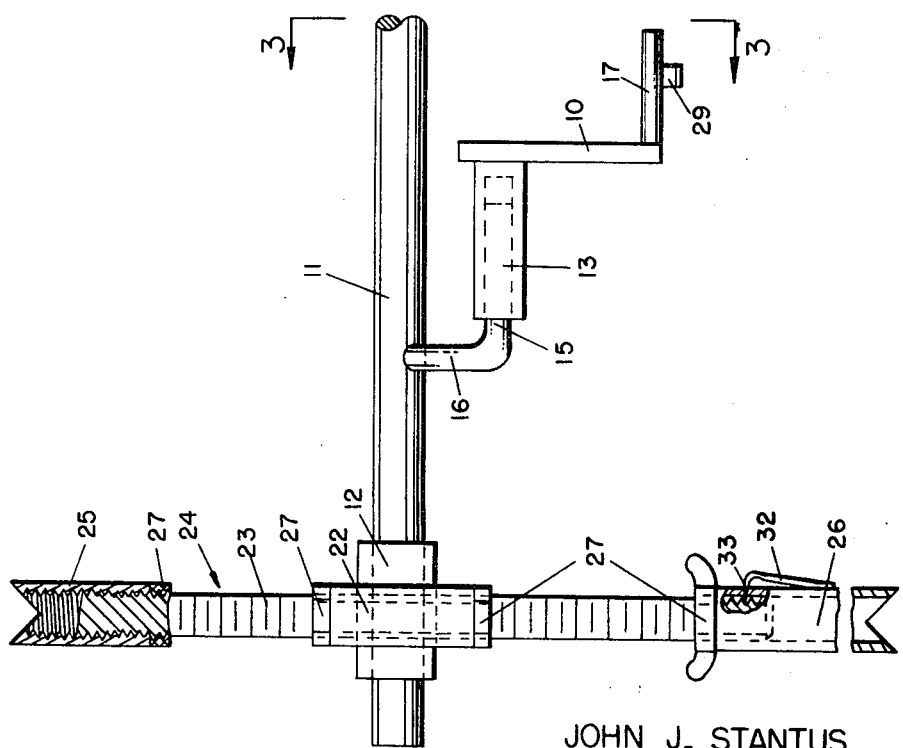

DUAL CONTROL DEVICE FOR AUTOMOBILES

This invention relates to dual control means for an automotive vehicle having a foot pedal and more particularly to an interchangeable dual control actuating device which may be readily applied and removed with respect to most automotive vehicles in accordance with manual selection.

An object of the invention is to provide a device which can readily be removably installed in an automotive vehicle and which provides means for actuating a foot pedal, for example the brake pedal by a passenger occupying the front seat opposed to the driver, as, for example, a driving instructor.

A further object of my invention is to provide novel releasable fastening means adapted to secure the device, with respect to an automotive vehicle, without modifying the vehicle structure in any way.

Yet another object of the invention is to provide a device of predetermined size with selected elements adjustably related one to another to facilitate its application to a wide range of conventional automobile configurations and sizes.

A further object of the invention lies in the provision of a device of the character set forth which is composed of a minimum number of parts assembled with facility at a commercially feasible cost and one which is not likely to malfunction.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention. MOreover, it is to be understood that while the invention is described in its particular association with a vehicle brake pedal, it is not my intention to unnecessarily limit the applicability of the invention and I desire to reserve to myself the claimed invention for every use of which it is now known or subsequently discovered to be susceptible.

Other advantages and features of this invention will become apparent from the more detailed description following in which like reference numerals are employed to designate similar parts in the accompanying drawings, wherein:

FIG. 2 is a front elevational view looking perpendicularly to the axis of the lateral rock shaft, partially in section.

Figure 1:
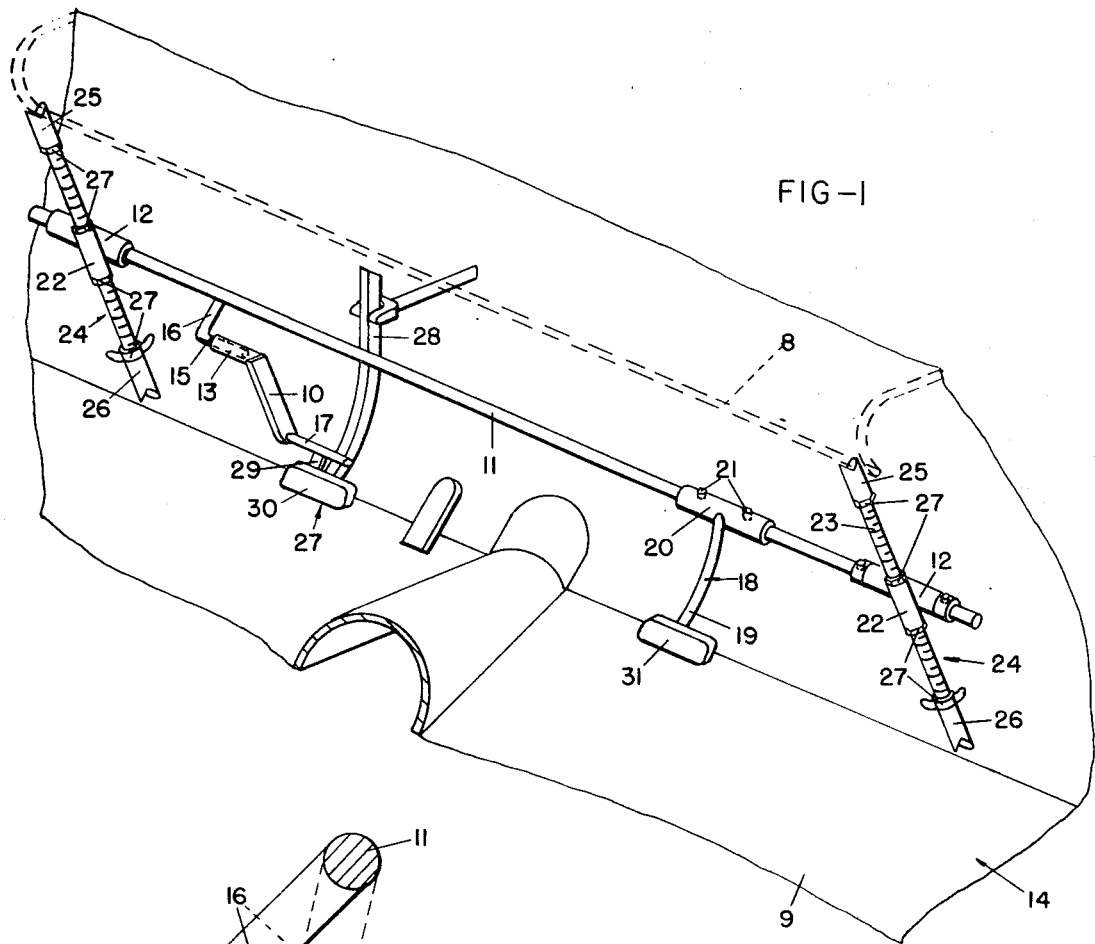
FIG. 1 is a perspective view of my dual control attachment releasably secured to a vehicle structure.
Figure 3:
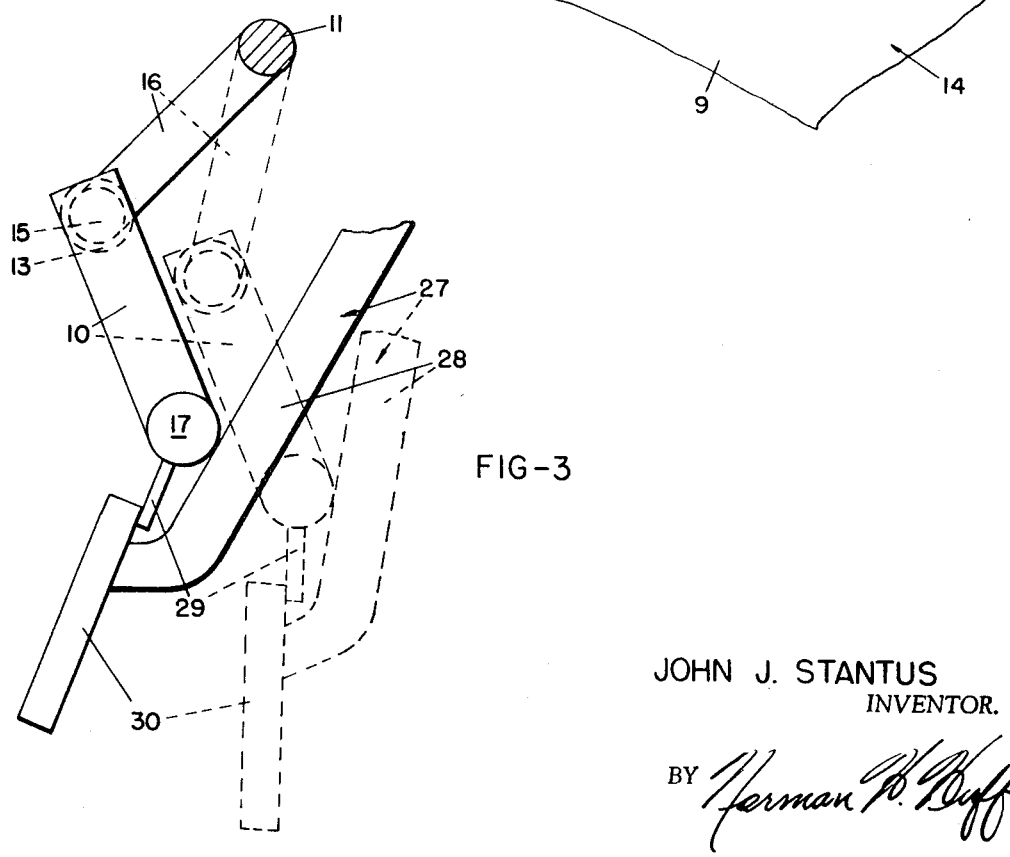
FIG. 3 is a fragmentary elevation of the foot pedal actuating means taken athwart of the axis of the rock shaft as at line 3—3 of FIG. 2.

My dual control device comprises generally a rock shaft 11 which is rotatably carried by spaced journal bearings 12 which are releasably fixed, with respect to the structure of the automotive vehicle 14, as will be more fully described hereinafter.

A brake foot pedal actuating spindle 15 is rigidly fixed to the rock shaft 11 in radially spaced parallel relationship by means of a bracket 16. An arm 10 is provided with a right angularly disposed sleeve 13 which rotatably receives the spindle 15 to form an articulate connection. Opposed to the sleeve 13, arm 10 has means for connecting to a manually depressable foot pedal 27 and includes a right angle cross arm 17, adapted to strike the said manually depressable foot pedals reach 28, and a tongue 29 for insertion behind the foot pad 30.

Near the end of the rock shaft 11 opposed to the bracket 16 I have provided an auxiliary pedal 18 which is carried by an arm 19 terminating in a sleeve 20 which encircles rock shaft 11 in close tolerance for movements axially and radially of the said shaft 11. Set bolts 21—21 facilitate the manual release and adjustment to selected longitudinal and radial fixed positions.

The journal bearings 12 are fixed upon sleeves 22 either as an integral part or welded thereto. The sleeves 22 are designed to slidably receive the central portions 23 of longitudinally variable struts 24—24. Said central portions 23 are shown to be externally threaded bars each of which has an internally threaded mating sleeve-like head 25 and an unthreaded foot 26 respectively on its upper and lower ends. The several sleeves (22–25–26) are adjustably fixed relative to the central portion 23 by lock nuts 27—27. It will thus be seen that the struts may be releasably secured in a vehicle by expanding the effective length of the struts 24 to cause the heads 25 and feet 26 to forcibly engage the vehicle floor 9 and dash 8 or other fixed structure above the floor 9.

It should be noted that each foot 26 is a sleeve having an opening through which the tongue 33 of spring lever 32 extends and mates with the threads of central portion 23 and thus provides means for fast adjustment by manually removing the tongue 33 from the threads while sliding the foot to its generally desired location and thence releasing the tongue to mate with the threads for fine adjustments by relative rotation of the foot 26.

Examination of the drawings clearly shows that the control device is manually adjustable to enable an operator to modify the relative positions of parts to fit most vehicles on the market today.

Having thus described my invention, I desire to secure by Letters Patent of the United States the following:

1. In a selectively applicable dual control device for automobiles having a manually depressable foot pedal on a vehicle supported reach, the combination of:
   a pair of spaced strut members having end portions selectively and releasably engageable respectively with the floor of the vehicle and fixed structure above the floor;
   a rock shaft journaled adjacent its ends to said strut members and provided with an auxiliary foot pedal operatively connected to rotate said rock shaft when depressed;
   a bracket on said rock shaft having a spindle fixed in spaced parallel relationship to said rock shaft;
   an arm articulately and removably interconnected to said spindle;
   a cross-bar on said arm for contacting the foot pedal reach; and
   a tongue for insertion behind the foot pedal.

2. The invention according to Claim 1, wherein:
   said auxiliary foot pedal has an arm provided with a sleeve at one end and a foot pad at the other;
   said sleeve encircling said rock shaft; and
   means securing said sleeve to said rock shaft with said arm extending at a selected radial position with respect to said rock shaft.

* * * * *